United States Patent [19]
Jones et al.

[11] Patent Number: 4,686,448
[45] Date of Patent: Aug. 11, 1987

[54] SLEWING POWER SUPPLY FOR PROGRAMMABLE PHASE SHIFTER DRIVE

[75] Inventors: Franklin B. Jones, Baltimore; Charles S. Kerfoot, Pasadena; Walter E. Milberger, Severna Park, all of Md.

[73] Assignee: The United States of America as represented by the Secretary of the Air Force, Washington, D.C.

[21] Appl. No.: 891,822

[22] Filed: Aug. 1, 1986

[51] Int. Cl.$^4$ .................................................. G05F 1/70
[52] U.S. Cl. .................................... 323/212; 323/267; 363/72; 342/372
[58] Field of Search ................... 363/72; 323/212, 215, 323/267; 342/372, 377

[56] References Cited

U.S. PATENT DOCUMENTS

| | | | |
|---|---|---|---|
| 3,237,088 | 2/1966 | Karp et al. | 323/22 |
| 3,448,372 | 6/1969 | Goff | 323/22 |
| 4,513,360 | 4/1985 | Ikenoue et al. | 363/20 |

FOREIGN PATENT DOCUMENTS

| | | | |
|---|---|---|---|
| 76599 | 4/1983 | European Pat. Off. | 323/267 |
| 1921357 | 11/1970 | Fed. Rep. of Germany | 363/72 |

Primary Examiner—William H. Beha, Jr.
Attorney, Agent, or Firm—William G. Auton; Donald J. Singer

[57] ABSTRACT

A programmable slewing power supply is used to drive microwave phase shifters according to a command signal from a system controller using: a Milberger converter; a power source; a rectifying circuit; two differential amplifier circuits; and two comparator amplifier circuits. The Milberger converter outputs a combined square wave which it produces by combining two independent square waves which add or cancel. The power source receives the combined square wave and outputs: a reference voltage, a positive voltage signal; and a negative voltage signal. The rectifying circuit produces a rectified command signal by rectifying the command signal from the system controller. The two differential amplifier circuits respectively measure the positive and negative voltage signals with respect to the reference voltage to produce a measured positive voltage signal, and a measured negative voltage signal. The comparator operational amplifiers produce complementary outputs to drive the phase shifters by respectively comparing the measured positive and negative voltage signals with the rectified command signal.

5 Claims, 8 Drawing Figures

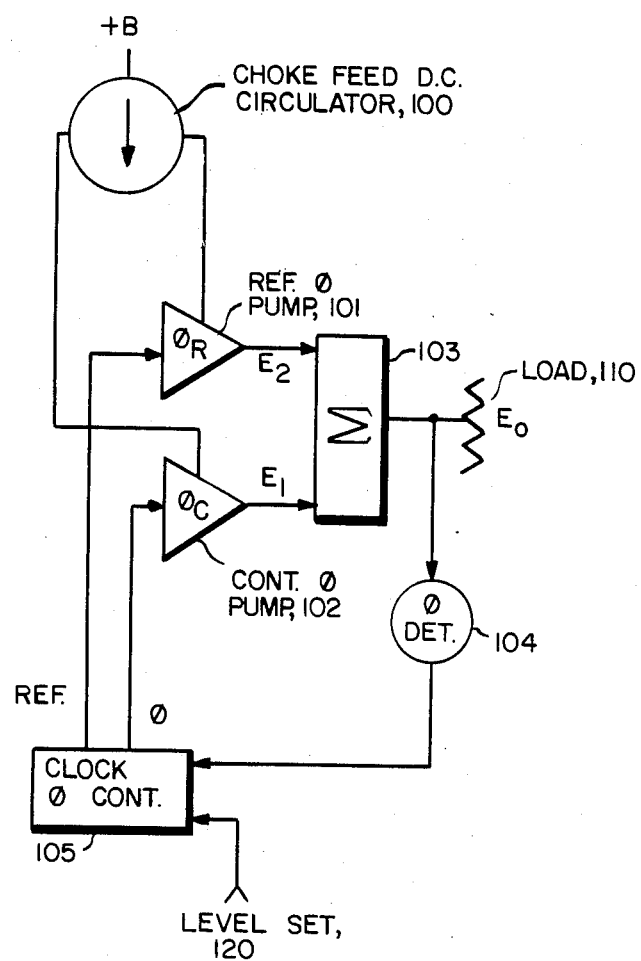
FIG. 4
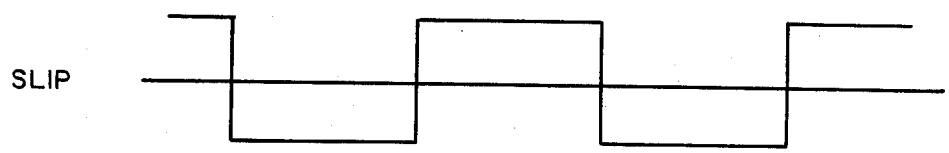
FIG.5A SLIP
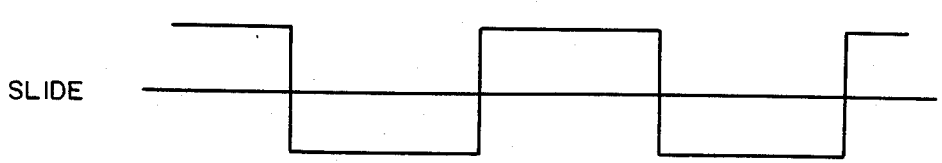
FIG.5B SLIDE
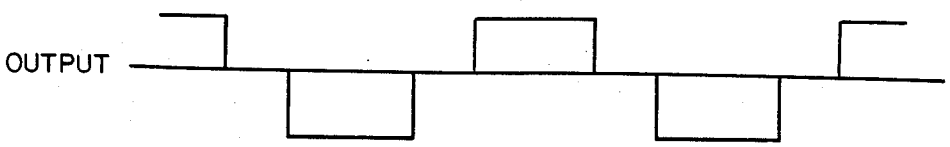
FIG.5C OUTPUT

SLEWING POWER SUPPLY FOR PROGRAMMABLE PHASE SHIFTER DRIVE

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in the following U.S. patent applications: Ser. No. 893,831, filed Aug. 6, 1986, entitled Self Generated Converter Filter by C. S. Kerfoot et al; Ser. No. 910,113, filed Jan. 28, 1986, entitled "Energy Recoverable Choke Feed" by W. E. Milberger et al; and Ser. No. 891,821, filed Aug. 1, 1986, entitled "High-Voltage Milberger Slip Slide Power Conditioner" by F. B. Jones et al.

BACKGROUND OF THE INVENTION

The present invention relates generally to electric power supply systems, and more specifically to a programmable slewing power supply to drive microwave phase shifters.

Phased array radar and communications systems steer emitted electromagnetic radio frequency (RF) signals electronically by shifting the phase of these signals with respect to a matrix of transmitter elements housed in the array. Some of these systems use microwave phase shifters to adjust the phase of signals received from a high-power signal source. However, just as the phase of these signals needs to be adjusted to produce different waveforms, the voltage levels also need to be adjustable.

The task of providing a programmable high-efficiency power supply for microwave phase shifters is alleviated, to some extent, by the systems disclosed in the following U.S. Patents, the disclosures of which are incorporated herein by reference: U.S. Pat. No. 3,237,088 issued to Karp; U.S. Pat. No. 3,448,372 issued to Goff; and U.S. Pat. No. 4,513,360 issued to Ikenoue.

The above-cited references all disclose power supply systems. Typical prior art systems also include supply systems which provide supply voltages using a fixed power supply with a series linear amplifier. Such supply voltages are variable but the supply systems are characterized as being low in efficiency, excessive in terms of power dissipation, and as having poor reliability in the linear amplifier due to the wide variation required for output currents and voltages. The reasons for such performance problems are discussed below.

Magnetic coils used in phase shifters present large inductive loads with a series resistance. Linear drive is typically implemented using a fixed voltage power supply and a transconductance amplifier. Current is commanded as a voltage to be developed across the sense resistor. The voltage provided by the power supplies can be divided into three portions. First, part of the available voltage is used to drive the load as required ($V=I*R$; $V=L*dI/dt$), with the load power being the product of this voltage and the drive current.

A second portion of the voltage is required by the linear amplifier to stay in its active region of operation, free of saturation effects. The third portion, consisting of the voltage provided in excess of the preceding two portions, must also be used by the linear amplifier. This voltage serves no useful purpose, being dissipated as waste heat in the amplifier, but must be available to accommodate changing load requirements.

The third portion of the voltage is dissipated by the linear amplifier as follows. For a resistive load, it can be shown that the maximum power dissipated by the linear amplifier with a fixed voltage power supply is at one half maximum current, $Pdiss = \frac{1}{2} Imax * V$. For an inductive load the current voltage waveforms are out of phase, so that the maximum amplifier dissipation is $Pdiss = Imax * V$.

The peak voltage requirements can be much higher than the average voltage resulting in very high power levels. For a particular phase shifter drive, the maximum current of 7 amperes and peak linear voltage of 500 volts result in an amplifier dissipation of in excess of three kilowatts, which must be sustainable for an indefinite period.

Clearly, it would be of great benefit to have power supplies which provide only the first two portions of voltage discussed, without the third. In general, this can be accomplished with any D.C.-D.C. converter which uses inductive filtering and is capable of providing efficient power conversion over a range of input and output voltages.

Two important concerns arise, both related to the rate at which the output must change. The first is the bandwidth of the power supply regulation loop. For stability in switchmode power supplies, the unity gain crossover is limited to a theoretical maximum of one half of the switching frequency. In practice, the limit is lower because of the need to allow for variances.

The second concern is the slew rate of the power supply under load. This is a function of the peak power output required and the rate of change of voltage needed. The supply must provide current at the proper voltage, while also providing current to charge the output capacitance to slew the voltage. This requires input line filtering to isolate surges from the prime power line.

From the foregoing discussion it is apparent that there currently exists the need for a high frequency switchmode power supply with high peak power capabilities and wide output range to support systems including those with microwave phase shifters. The present invention is intended to satisfy that need.

SUMMARY OF THE INVENTION

The present invention is a slewing power supply which provides a variable voltage supply for microwave phase shifters using: a Milberger slip slide converter as a voltage power supply; and a regulation circuit.

The Milberger slip slide power converter is best understood by referring to the above-cited disclosure of F. B. Jones et al, the disclosure of which is incorporated herein by reference.

As described by F. B. Jones et al, the Milberger slip slide power converter is a high-voltage converter circuit which uses a slip slide power conditioner to reduce non-monotonic non-linearities in the converter output signal. The slip slide power conditioner includes: a choke feed D.C. circulator, two radio frequency (RF) power pumps; a phase detector; a phase controller; and combiner. The choke feed D.C. circulator receives the D.C. input signal and produces therefrom two voltage output signals which are each sent to one of the two RF power pumps. The two RF power pumps produce two out-of-phase square wave output signals which are algebraically combined in the combiner to form an output signal whose amplitude is a function of phase difference. The phase detector and phase controller sample this output signal and adjust the phase of the two power pumps to remove non-linearities due to secondary ringing (resonance) that beats with harmonics of their square wave signals.

The regulation circuit of the present invention is a signal processing circuit which receives the output signals from the Milberger slip slide converter and command signals from a system controller and produces therefrom a complementary power supply for the microwave phase shifters. In one embodiment of the invention, this regulation circuit includes: two rectifying operational amplifier circuits; two differential operational amplifier circuits; and two comparator operation amplifier circuits which produce the complementary power supply for the phase shifters. In this embodiment, the invention uses the Milberger slip slide converter as a dynamic power supply with controlled amplitude. The voltage command signal is received by the two rectifying operational amplifier circuits which provide therefrom the absolute value of the command in the form of a rectified command voltage signal.

The power supply output signals of the Milberger slip slide converter are sensed by the two differential amplifier circuits. These differential amplifier circuits respectively measure the positive and negative voltages of the Milberger slip slide converter with respect to the base voltage to produce a measured positive voltage signal and a measured negative voltage signal.

The two comparator operational amplifier circuits respectively compare the measured positive voltage signal and the measured negative voltage signal, from the two differential amplifier circuits, with the rectified command voltage signal, from the rectifying operation amplifier circuits, to produce two command output control voltage signals. The higher of the two output control voltage signals dominates the output and is sent to the microwave phase shifters. By providing only the amount of voltage actually required under dynamic conditions, it greatly reduces power dissipation in series linear elements, easing design requirements and improving reliability. The supply is made possible by the Milberger slip slide converter, which provides efficient high frequency operation with high peak power capability.

It is an object of the present invention to provide a dynamic supply of power to microwave phase shifters.

It is another object of the present invention to reduce power dissipation and increase the efficiency of power supply systems.

It is another object of the present invention to provide a regulator circuit for use with a Milberger slip slide converter to produce a slewing power supply.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 4 is a schematic of a Milberger slip slide converter;

FIGS. 5A, 5B and 5C are charts that respectively depict the slip and slide square waves of two square wave choppers, and the combined output signal of a Milberger converter.

DETAILED DESCRIPTION OF THE PREFERRED EMBODIMENT

The present invention is a slewing power supply which can be used to drive microwave phase shifters with high efficiency.

Figure 1:
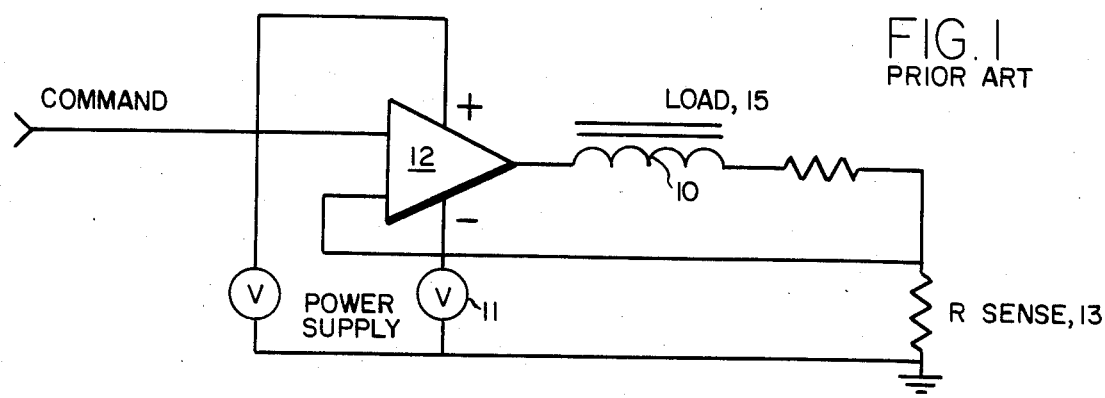
FIG. 1 is an electrical schematic of a prior art power supply system.

The reader's attention is now directed towards FIG. 1 which is an electrical schematic of a typical prior art power supply system. The power supply system of FIG. 1 uses magnetic coils 10 to implement a linear drive. Magnetic coils used in phase shifters present large inductive loads with a series resistance. Linear drive is typically implemented using a fixed voltage power supply 11 and a transconductance amplifier 12. Current is commanded as a voltage to be developed across the sense resistor 13.

Figure 2:
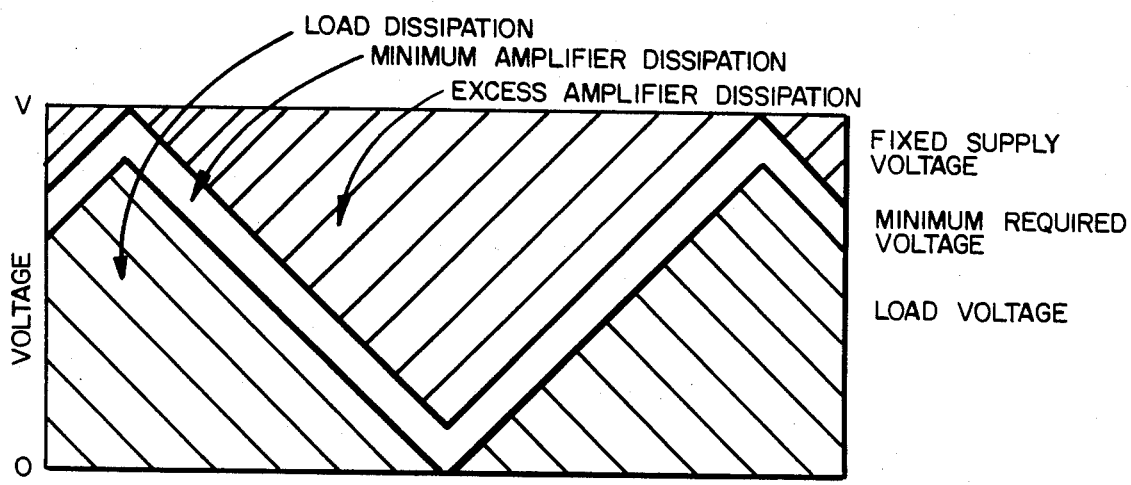
FIG. 2 is a chart depicting the three portions of voltage usage in power supply systems.

FIG. 2 is a chart depicting the three portions of voltage usage in power supply systems. As mentioned above, the voltage provided by the power supplies can be divided into three portions. Part of the available voltage is used to drive the load as required ($V=I*R$; $V=L*dI/dt$), with the load power being the product of this voltage and the drive current.

The second portion of the voltage is required by the linear amplifier to stay in its active region of operation, free of saturation effects. The third portion, consisting of the voltage provided in excess of the preceding two portions, must also be dropped by the linear amplifier. This voltage serves no useful purpose, being dissipated as waste heat in the amplifier, but must be available to accommodate changing load requirements.

For a resistive load, it can be shown that the maximum power dissipated by the linear amplifier with a fixed voltage power supply is at one half the maximum current, $Pdiss = \frac{1}{2} Imax * V$. For an inductive load the current and voltage waveforms are out of phase, so that the maximum amplifier dissipation is $Pdiss = Imax * V$.

Figure 3:
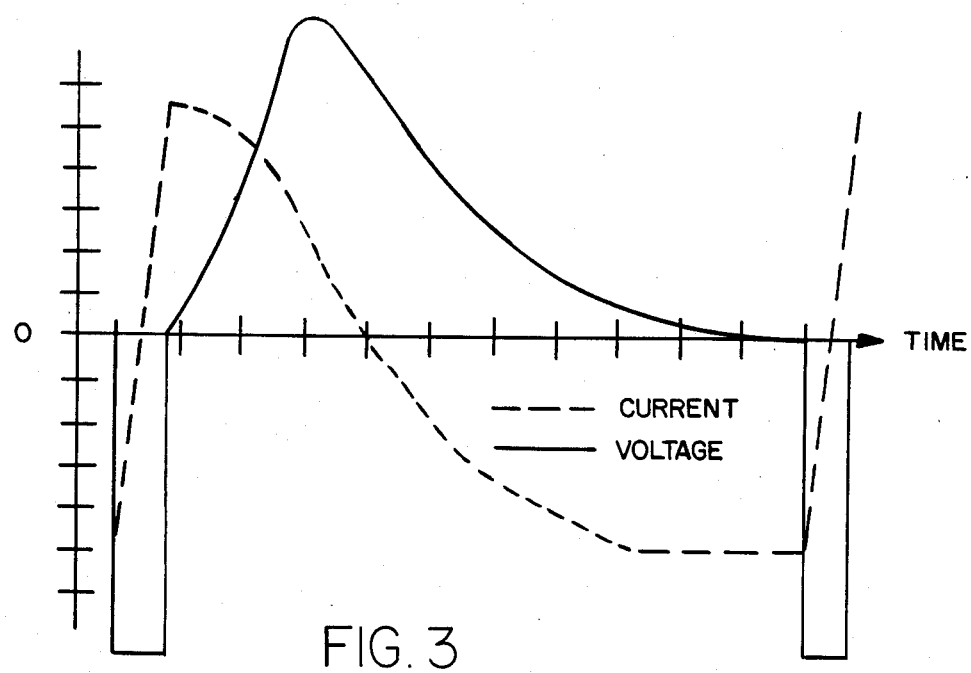
FIG. 3 is a chart depicting drive current and voltage in phase shifter drive applications.

FIG. 3 is a chart depicting drive current and voltage which indicates that the peak voltage requirements can be much higher than the average resulting in very high power levels. For one particular phase shifter drive, the maximum current of 7 amperes and peak linear voltage of 500 volts result in an amplifier dissipation of in excess of 3 kilowatts, which must be sustainable for an indefinite period.

To satisfy the foregoing considerations, which require a high frequency switchmode power supply with high peak power capability and a wide output range, a 150 KHz Milberger slip slide converter is used in the present invention as the means of D.C.-D.C. conversion in a power supply. In this converter two 150 KHz square waves, known as the "slip" and "slide" phases, are generated by MOSFET full bridge choppers. These phases are magnetically combined and integrated with the relative phase determining the output power.

FIG. 4 is a schematic of a Milberger slip slide converter, as described in the above-cited reference of F. B. Jones et al, the disclosure of which is incorporated by reference. The high-voltage Milberger slip slide power conditioner operates as follows: The choke feed D.C. circulator receives the D.C. input signal and produces therefrom two voltage output signals which are each sent to one of the two RF power pumps 101 and 102. The purpose of the choke feed circulator 100 is to supply a current feed to both the power pumps with current limiting imposed on the D.C. input signal. This current limiting is intended to minimize transistor switch through losses and is also effective when short circuit and overload conditions appear at the load. The choke feed D.C. circulator 100 is intended to provide fail-safe protection to the circuit, enhance the full load efficiency, and divide the D.C. input signal into a first and second voltage reference signal which are sent to the two power pumps 101 and 102.

The two RF power pumps 101 and 102 are actually two phase control choppers that produce two out-of-phase square wave output signals which are algebraically combined in the combiner to form an output signal whose amplitude is a function of phase difference. The first of the two phase control choppers is a continuous phase pump which receives the first voltage reference signal from the choke feed D.C. circulator, and produces therefrom a continuous phase square wave signal. The second of the two phase control choppers is a reference phase pump which receives the second voltage reference signal from the choke feed D.C. circulator, and produces therefrom a phase square wave signal.

The Milberger computer works by the principal of having parts of two independent square waves either add or cancel. FIGS. 5A, 5B and 5C are charts that respectively depict the slip and slide square waves produced by the two square choppers of the Milberger converter and the combined output signal produced by the combiner. Note that the relative phase between the square waves of FIGS. 5A and 5B affects the amplitude of the combined output of FIG. 5C.

Figure 6:
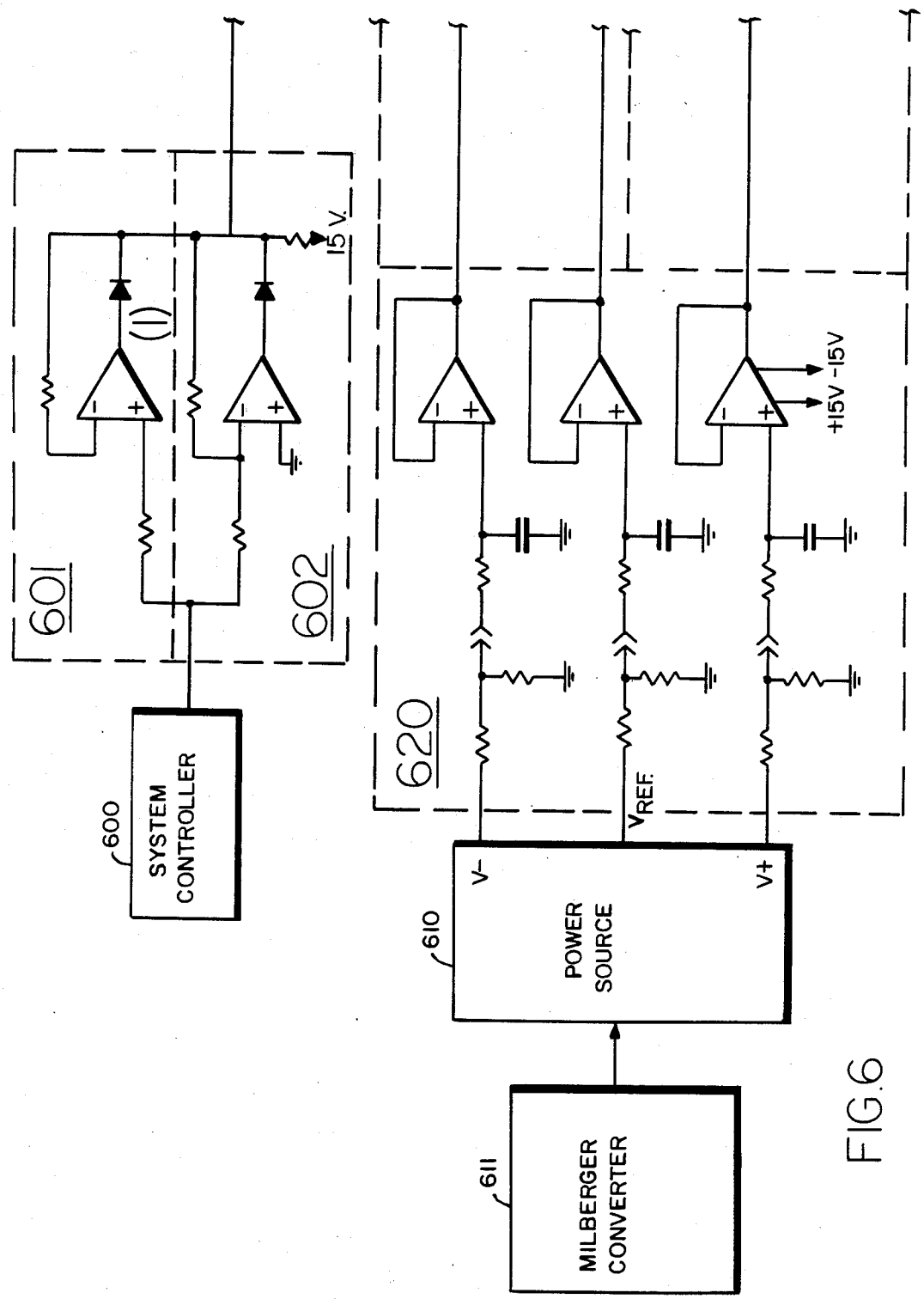
FIG. 6 is a detailed circuit diagram of an embodiment of the present invention.
Figure 6:
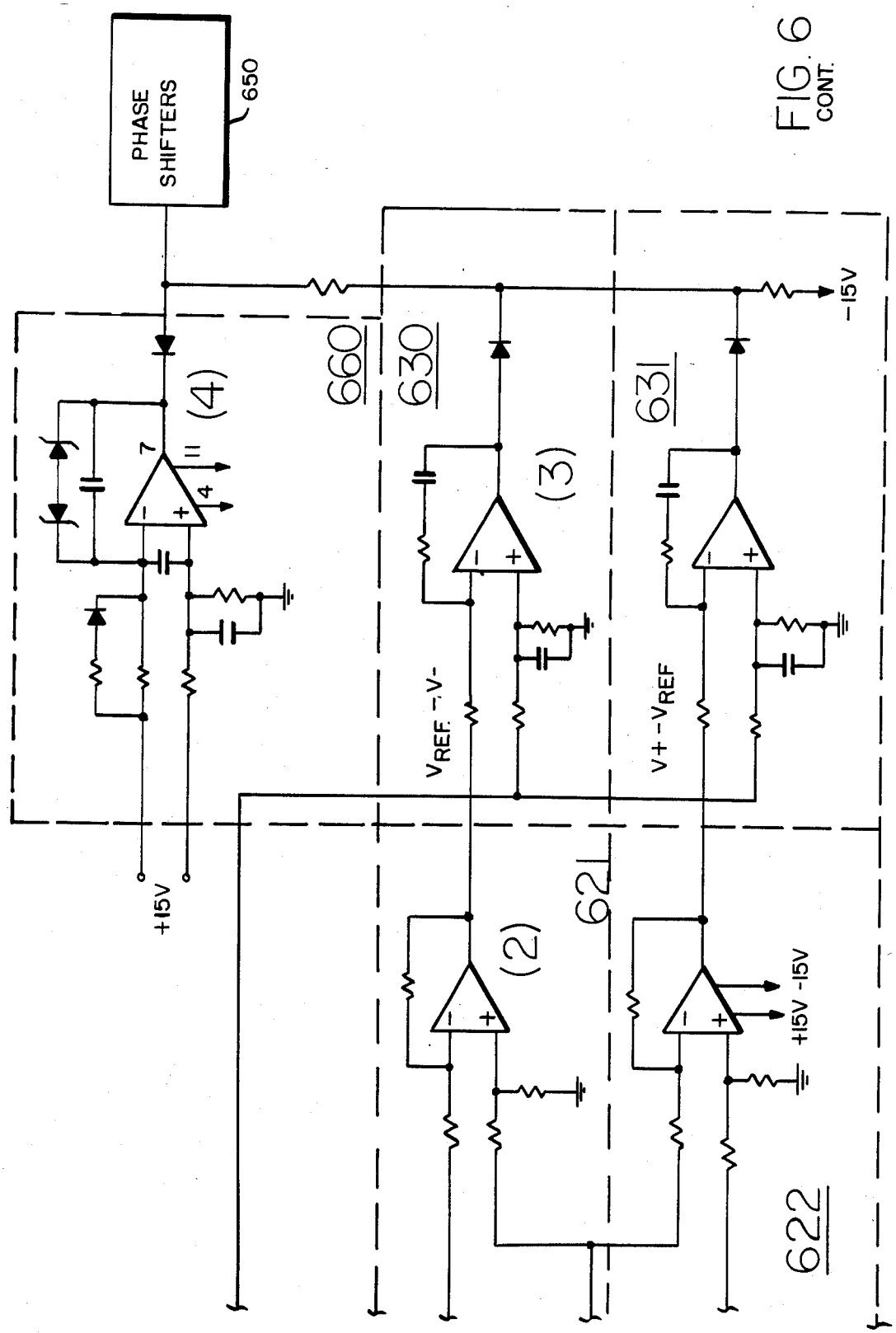

FIG. 6 is a detailed circuit diagram of an embodiment of the regulator circuit of the present invention, which receives the output signals of the Milberger converter of FIG. 4, and command signals from a system controller to produce a complementary power supply for microwave phase shifters. The voltage command signal is received from the system controller 600 by two rectifying operational amplifier circuits 601 and 602 to produce therefrom the absolute value of the command in the form of a rectified command voltage signal.

The Milberger slip slide converter 611 is used as a part of the power source 610. The regulator circuit receives three inputs from the power source 610: a reference voltage $V_{REF}$ and the positive and negative components $V+$ and $V-$ of the Milberger converter combined output signal depicted in FIG. 5C. These positive and negative components are available by rectifying the output of the square wave signal. All three inputs from the power source 610 are amplified by three input amplifiers in a booster circuit 620.

The three amplified power supply signals from the booster circuit 620 are sensed by two differential amplifier circuits 621 and 622. These differential amplifier circuits respectively measure the positive and negative voltages ($V+$ and $V-$) of the Milberger slip slide converter, with respect to the base voltage $V_{REF}$ to produce a measured positive voltage signal and a measured negative voltage signal.

Two comparator operational amplifier circuits 630 and 631 respectively compare the measured positive voltage signal and the measured negative voltage signal (from differential amplifier circuits 621 and 622) with the rectified command voltage signal to produce two command output control voltage signals which meet and a single output to the microwave phase shifters 650. The higher of the two command output control voltage signals produced by the comparator circuits 630 and 631 predominates and is sent to the microwave phase shifters 650.

The embodiment of FIG. 6 also includes a slow start circuit 660 which controls power surges during initial operation of the slewing power supply. The slow start circuit 660 is electrically connected to the two comparator operational amplifier circuits 630 and 631 to receive the two command output control voltage signals received by them. The slow start circuit contains an operational amplifier which serves to control transient spikes which may occur during initial activation of the power supply.

A significant feature of the slewing power supply system of FIG. 6 is the use of a dynamic output D.C.-to-D.C. conversion for the high efficiency linear drive of an inductive load. The outputs of the Milberger converter are complementary voltages, which allow balanced operation of operational amplifiers. These outputs can be centered on dynamic floating base voltage rather than ground to decrease the voltage standoff requirements of the linear amplifier. At any instant only one of the two outputs will be providing power to the load. The voltage is therefore regulated according to the more heavily loaded output at any instant, to assure that the minimum required voltage is available at all times.

The power supply of FIG. 6 uses a 150 KHz Milberger slip slide converter to provide high efficiency and high frequency power conversion. The high switching frequency of 150 KHz allows a regulation loop, sufficiently fast to track the voltage requirements, to be closed. The use of MOSFETs instead of Bipolar transistors in the choppers allows high peak power output, as the MOSFET is limited by average than peak current. The slip slide's input circulator provides a current reserve for these peaks, while presenting a more uniform average load to the prime power line.

The Milberger converter and regulator circuit uses complementary outputs as a voltage bracket for the operational amplifier circuits, and uses the superposition of output voltages on a base voltage to minimize the voltage standoff requirements on series linear elements.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A slewing power supply, for use with a system controller which outputs voltage command signals which dynamically directs said slewing power supply to produce a responsive slewed output voltage to drive an inductive load, said slewing power supply comprising:

a Milberger converter which produces a combined square wave output signal composed of a positive voltage signal component and a negative voltage signal component;

a power source which outputs a reference voltage signal which is a floating base voltage, said power source also receiving said combined square wave output signal from said Milberger converter and separately outputting said positive voltage signal component and said negative voltage signal component; and a means for regulating signals produced by said power source in accordance with said voltage command signals produced by said system controller, said regulating means being electrically connected with said power source and said system controller and outputting to said inductive load said responsive slewed output voltage in a form which comprises a first and second complementary voltage signal, said first complementary voltage signal being produced by respectively measuring said positive voltage signal component and said negative voltage signal component with said reference voltage signal to produce a measured positive voltage signal and a measured negative voltage signal, said regulating means then outputting said first and second complementary voltage signals by respectively comparing said measured positive voltage signal and said measured negative voltage signal with a rectified version of said voltage command signals, said regulating means producing said rectified version of said voltage command signals by rectifying said voltage command signals.

2. A slewing power supply, as defined in claim 1, wherein said regulating means comprises:

a means for rectifying said voltage command signals to produce said rectified voltage command signals;

a means for measuring said positive voltage signal component and said negative voltage signal component respectively with said reference voltage signal to produce said measured positive voltage signal and said measured negative voltage signal, said measuring means being electrically connected with said power source and receiving electrical signals therefrom;

first and second comparative operational amplifier circuits which are electrically connected to and receive said rectified voltage command signals from said rectifying means, said first comparative operational amplifier circuit producing said first complementary voltage signals by comparing said measured positive voltage signal, from said measuring means, with said rectified voltage command signals; and said second comparative operational amplifier circuit producing said second complementary voltage signals by comparing said measured negative voltage signal, from said measuring means, with said rectified voltage command signals.

3. A slewing power supply, as defined in claim 2, wherein said measuring means comprises a first and second differential operational amplifier circuits which are electrically connected to and receive said reference voltage signal from said power source, said first differential operational amplifier circuit producing said measured positive voltage signal by measuring said positive voltage signal component, from said power source, with said reference voltage signal;

said second differential opertional amplifier circuit producing said measured negative voltage signal by measuring said negative voltage signal component, from said power source, with said reference voltage signal.

4. A slewing power supply as defined in claim 3, wherein said inductive load comprises a plurality of microwave phase shifters and said Milberger converter is capable of producing said combined square wave output signal with power above ten kilowatts and at frequencies of about 150 KHz to provide a high frequency D.C. to D.C. conversion which allows said first and second complementary voltage signals to track with said voltage command signals from said system controller.

5. A slewing power supply, as defined in claim 4, wherein said regulating means includes a slow start circuit which is electrically connected to and receives said first and second complementary voltage signals from said first and second differential operational amplifiers to control any power surges contained therein during an initial activation of slewing power supply.

* * * * *